(12) United States Patent
Lozano Garcia et al.

(10) Patent No.: US 8,852,709 B2
(45) Date of Patent: Oct. 7, 2014

(54) COMPOSITE MATERIAL PART WITH LARGE VARIATION IN THICKNESS

(75) Inventors: Jose Luis Lozano Garcia, Getafe (ES); Jose Orencio Granado Macarrilla, Torrejon de la Calzada (ES); Vicente Martinez Valdegrama, Collado Villalba (ES)

(73) Assignee: Airbus Operations, S. L., Getafe (ES)

( * ) Notice: Subject to any disclaimer, the term of this patent is extended or adjusted under 35 U.S.C. 154(b) by 284 days.

(21) Appl. No.: 13/318,531

(22) PCT Filed: May 5, 2010

(86) PCT No.: PCT/ES2010/070296
§ 371 (c)(1),
(2), (4) Date: Feb. 13, 2012

(87) PCT Pub. No.: WO2010/128192
PCT Pub. Date: Nov. 11, 2010

(65) Prior Publication Data
US 2012/0282430 A1 Nov. 8, 2012

(30) Foreign Application Priority Data

May 6, 2009 (ES) .................................. 200901152

(51) Int. Cl.
*B32B 3/26* (2006.01)
*B32B 5/14* (2006.01)
*B32B 5/26* (2006.01)
*B29C 70/30* (2006.01)

(52) U.S. Cl.
CPC ................ *B29C 70/30* (2013.01); *B32B 5/145* (2013.01); *B32B 5/26* (2013.01); *B32B 2260/046* (2013.01); *B32B 2605/18* (2013.01); *B32B 2260/023* (2013.01); *B32B 2305/076* (2013.01)
USPC .............................. 428/77; 428/156; 428/189

(58) Field of Classification Search
CPC .............. B32B 3/263; B32B 2260/023; B32B 2250/20; B32B 2605/18
USPC ................ 428/77, 156, 105–114; 244/123.1, 244/129.1, 131
See application file for complete search history.

(56) References Cited

U.S. PATENT DOCUMENTS 4,786,033 A 11/1988 Kofler
6,372,072 B1 4/2002 Healey
(Continued)

FOREIGN PATENT DOCUMENTS

EP   0 225 485    6/1987
EP   0 660 005    6/1995
WO   00 34031    6/2000

OTHER PUBLICATIONS

International Search Report Issued Dec. 10, 2010 in PCT/ES10/070296 filed May 5, 2010.

*Primary Examiner* — Alexander Thomas
(74) *Attorney, Agent, or Firm* — Oblon, Spivak, McClelland, Maier & Neustadt, L.L.P.

(57) ABSTRACT

A composite material part and method for manufacturing the part. The part has a large variation in thickness between a first zone having a thickness E1 and a second zone having a thickness E2, which is made as a single part with a transition zone, external surfaces of which have gradients of magnitude, in which the structure of the stack includes; b1) a plurality of continuous plies that extend in the three zones; b2) a plurality of plies that extend in the first zone and in the transition zone, terminating in a stepped manner in the transition zone; b3) a plurality of plies that extend in the first zone and in the transition zone, terminating in a stepped manner in the transition zone.

7 Claims, 2 Drawing Sheets

(56) References Cited

U.S. PATENT DOCUMENTS 7,722,944 B2 5/2010 Martinez Valdegrama et al.
8,016,235 B2 9/2011 Ramirez Blanco et al.
2009/0311462 A1* 12/2009 Goering .......................... 428/99
2009/0321575 A1 12/2009 Barroso Vloedgraven et al.
2009/0321985 A1 12/2009 De Julian Aguado et al.
2010/0247903 A1 9/2010 Martinez Valdegrama et al.

* cited by examiner

COMPOSITE MATERIAL PART WITH LARGE VARIATION IN THICKNESS

FIELD OF THE INVENTION

The present invention relates to the stack structure of a composite material part with a large variation in thickness which is manufactured by curing said stack in an autoclave and, more particularly, to the stack structure of a composite material part used in an aircraft structure.

PRIOR ART

In the aeronautical industry processes for manufacturing parts which comprise basically a first step involving stacking of plies by means of ATL (Automatic Tape Lay-Up) and a second step involving curing in an autoclave are widely known.

During the stacking step, layers of composite material such as a prepreg which is a mixture of fibrous filler and a polymer matrix suitable for storage are placed in a mould or tool of suitable shape.

This material may assume different forms and in particular may be in the form of a ply. In the case of thermosetting matrices, usually the resin is cured partially or is brought by means of another process to a controlled viscosity, called "B-stage".

The plies of composite material are not placed randomly, but are arranged in each zone in a number and with an orientation of their fibrous filler, typically carbon fibres, chosen depending on the nature and the magnitude of the forces which the part must withstand in each zone. Usually ATL (Automatic Tape Lay-Up) machines are used for this purpose.

Automatic tape lay-up machines are very efficient for manufacturing flat or substantially flat laminated articles since the admissible gradients for said machines are small. This limitation means that in those aeronautical structures which have zones of different thickness it is required to extend greatly the thickness changing ramps, especially when the differences in thicknesses are very pronounced, with a consequent impact on the weight.

The present invention aims to solve this problem.

SUMMARY OF THE INVENTION

One object of the present invention is to provide a stack structure of a part made of composite material with a large variation in thickness between two zones, which facilitates optimization thereof in terms of weight and dimensions.

Another object of the present invention is to provide a stack structure of a part made of composite material with a large variation in thickness between two zones which may be achieved using an ATL machine.

According to a first aspect, these and other objects are achieved by providing a part with a first zone having a thickness E1 and a second zone having a thickness E2 which is produced as a single part with a transition zone between said zones, the external surfaces of which have gradients of magnitude P1, P2, with a stack structured as follows:
- a plurality of continuous plies which extend in the three zones mentioned;
- a plurality of plies which extend in the first zone and in the transition zone, terminating in a stepped manner in the transition zone, so as to compensate for the difference in thickness between the first and second zones corresponding on one side to the gradient P1 and on the other side to the gradient P2.

In a preferred embodiment the structure of the stack comprises:
- two outer sections with continuous plies which extend in the three zones mentioned parallel to its surfaces;
- a central section with continuous plies which extend in the three zones mentioned parallel to the surfaces of the first and second zones;
- two intermediate sections between the outer sections and the central section with plies which extend in the first zone and in the transition zone parallel to the surface of the first zone and which terminate in a stepped manner in the transition zone. This results in an optimized stack structure for parts with variations in thickness such as that corresponding to the zone for fastening components of the trailing and/or leading edge to the skin of the torsion box of a horizontal tail stabilizer of an aircraft, by making use of the ramp which must exist in the stacking cradle of said skin in order to ensure aerodynamic continuity between the skin and the component of the trailing and/or leading edge, so as to configure a transition zone which is optimized in terms of weight and dimensions.

According to a second aspect, the objects mentioned are achieved with methods for manufacturing the part which comprise stacking plies of composite material on a stacking tool with the form of the external surface of the part, in separate steps, depending on the structure of the stack and curing thereof in a suitable device.

Other characteristic features and advantages of the present invention will emerge from the detailed description which follows of an example of embodiment of the subject of the invention with reference to the accompanying figures.

DETAILED DESCRIPTION OF THE INVENTION

Figure 1A:
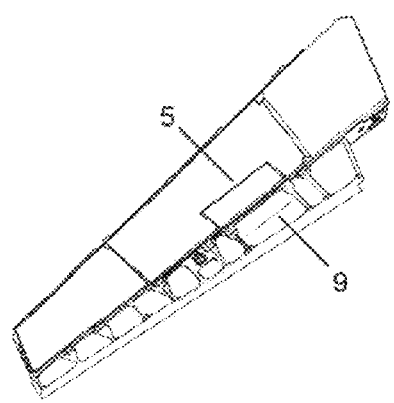
FIG. 1a is a view of the assembly formed by the torsion box and the trailing edge of a horizontal tail stabilizer of an aircraft, with a torsion box whose skin is a part which a large variation in thickness.
Figure 1B:
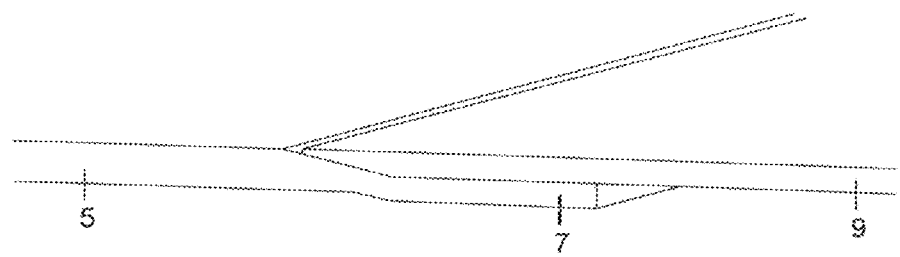
FIG. 1b is a partial detailed view of a zone for fastening the skin of the box to a trailing edge component.

The present invention is applicable to parts made of composite material with large variations in thickness. Examples of parts of this type in the aeronautical industry include the skins of the torsion boxes of horizontal tail stabilizers, shown in FIGS. 1a and 1b, where there is a large variation in thickness between the skin 5 of the actual box itself and the flange 7 for fastening a panel 9 of the trailing edge. In this case the external surface of the skin 5 and the surface of the panel 9 of the trailing edge must be aligned so as to ensure aerodynamic continuity.

As already mentioned, the conventional solution of the prior art for being able to manufacture singly parts with zones of varying thickness using an ATL machine is to ensure that the ramps of the transitions zones between the zones of varying thickness are compatible with the requirements of said machines.

Figure 2:
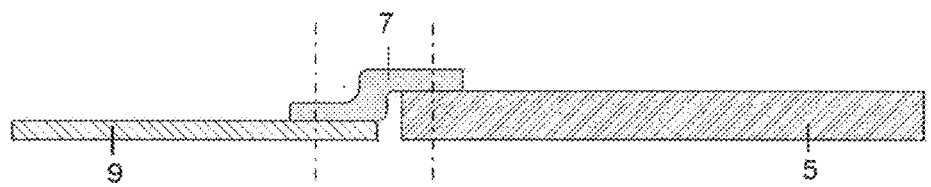
FIG. 2 is a cross-sectional view of a solution known in the art for assembling composite material parts with large variations in thickness.

In the case considered here, an alternative to manufacturing a single part with ramps which are too long is shown in FIG. 2 where the fastening flange 7 is made as a part separate from the skin 5 so that it can be subsequently joined to the latter and to the trailing edge panel 9.

In this context, the basic idea of the present invention, in order to achieve the objective of manufacturing said part as a single part with a smooth transition between the zones of different thickness and limiting as far as possible the length of the transition zone, is to use the step existing in the outer side of the zones of different thickness, namely in the external surface of the part, in order to structure suitably the stack in the transition zone.

Figure 3:
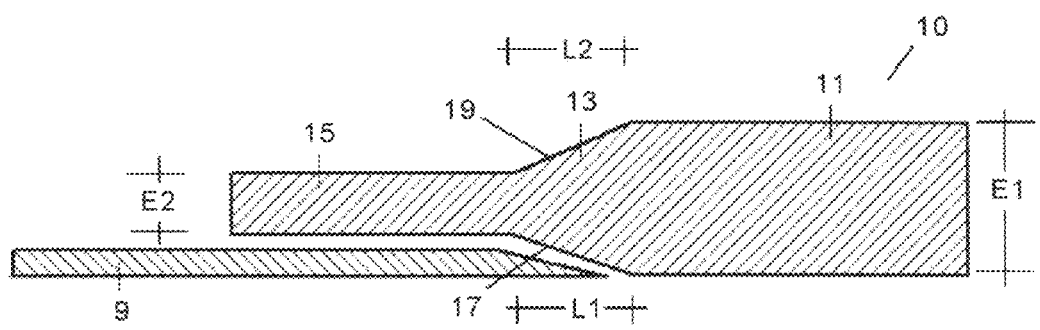
FIG. 3 is a schematic cross-sectional view of the assembly of composite material parts in which one of the parts is a part with large variations in thickness according to the present invention.

With reference to FIG. 3 it can be seen that the part according to the present invention comprises: a first zone 11 with a thickness E1, a second zone 15 with a thickness E2 and a transition zone 13 between them, the surfaces 17, 19 of which with longitudinal dimensions L1, L2 have gradients P1 and P2, respectively.

Figure 4A:
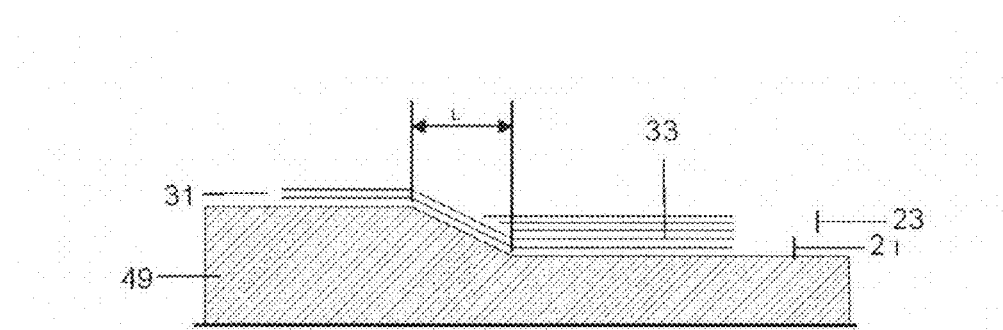
FIGS. 4a, 4b, 4c and 4d are schematic views of the process for laying up a part with large variations in thickness according to the present invention.
Figure 4B:
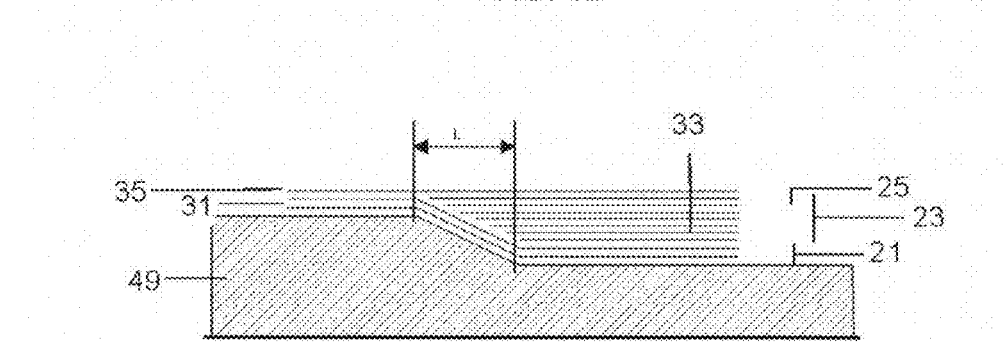
Figure 4C:
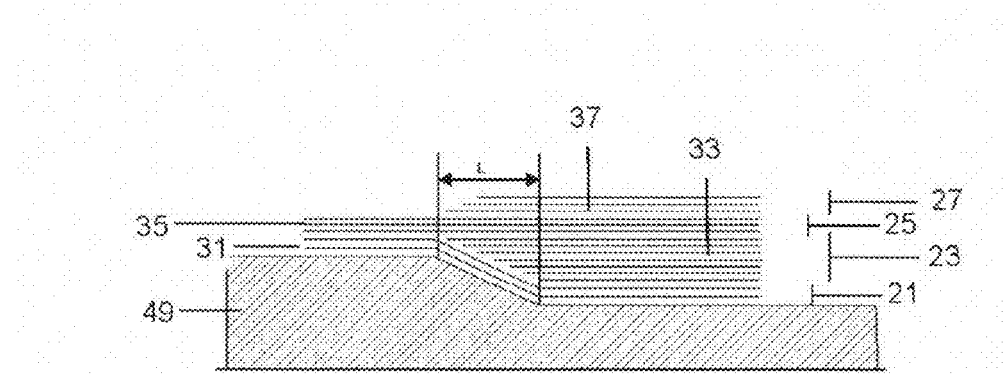
Figure 4D:
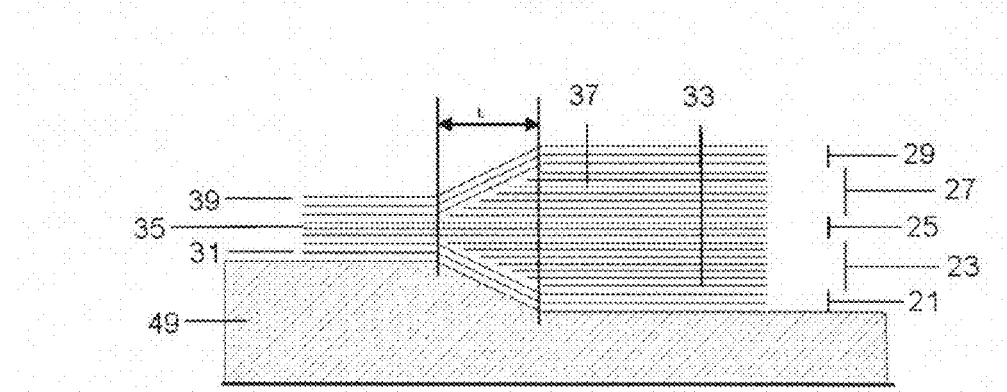

The stack structure of the part 10 in a preferred embodiment of the invention shown in FIG. 4d is as follows:

- two outer sections 21, 29 with continuous plies 31, 39 which extend in the three zones mentioned 11, 13, 15 parallel to its surfaces, i.e. adapting to the ramps of the transition zone 13;
- a central section 25 with continuous horizontal plies 35 which extend along the part;
- two intermediate sections 23, 27 between the outer sections 21, 31 and the central section 25 with horizontal plies 33, 37 which extend in the first zone and in the transition zone 13, terminating in a stepped manner in the transition zone 13.

With reference to FIGS. 4a, 4b, 4c, 4d, these show the basic steps which are adopted during laying-up of the part 10 on a stacking cradle 49 whose surface corresponds to the aerodynamic surface of the part 10:

- during a first step the plies 31 of the section 21 which follow the outer geometrical form of the part 10 and the stacking cradle 49 are laid up; the plies may be stacked by an ATL machine since the gradient P1 is compatible with its requirements;
- during the second step the plies 33 of the section 23 are laid up; as shown in FIGS. 4a, 4b the plies 33 are "terminated" in the transition zone 13, causing a first reduction in thickness of the part 10 corresponding to the step formed in the cradle 49;
- during the third step the plies 35 of the central section 25 are laid up;
- during the fourth step the plies 37 of the section 27 are laid up; as shown in FIGS. 4c, 4d the plies 37 are "terminated" in the transition zone 13, forming a step and causing a second reduction in thickness of the part 10; the perimeter of these plies does not coincide in plan view with the perimeter of the plies "terminated" in the second step; the "termination" of these plies is therefore interposed between the "termination" of the plies of the second step;
- during the fifth step the plies 39 of the section 29 are laid up; the plies may be stacked using an ATL machine.

In other embodiments of the stack arrangement there could be continuous plies 31, 35, 39 which are interposed between the plies 33, 37 which terminate in the transition zone 13, in which case the ATL machine will stack in succession on the stacking cradle 49 as many continuous plies 31, 35, 39 along the three zones 11, 13, 15 as there are plies 33, 37 which terminate in the transition zone 13. As already described, during formation of the stack firstly plies would be terminated against the ramp 17 and, once the stack has exceeded the thickness of the second part 15, plies on the other side (that of the ramp 19) would also be terminated until the thickness of the first part 11 is obtained.

The gradients P1, P2 of the surfaces 17, 19 of the transition zone 13 must be the same or less than the maximum admissible gradient for laying up with an ATL machine which at present may be defined as 1:5.

In the case where the part 10 corresponds to the zone for fastening the skin of the torsion box of a horizontal tail stabilizer to a component of the leading edge or the trailing edge, as shown in FIG. 2, if the panel 9 has, for example, a thickness of 3.5 mm, this means, assuming a gradient of 1:5 as maximum admissible gradient for an ATL machine, that the length L1 of the surface 17 of the transition zone 13 is 17.5 mm. On this basis, the length L2 and gradient P2 of the surface 19 are determined by the difference in thicknesses of the skin 5 and the fastening zone 7.

In the type of parts considered here, the transition zone 13 normally has the form shown in FIGS. 4a, 4b with its two ramp surfaces 17, 19 within a transition zone of length L because the differences in thicknesses of the skin 5 and the fastening zone 7 allow the gradient P2 to be equal to or less than P1. This is desirable in order to optimize the length of the transition zone since the ramps are not suitable for joining together other parts such as, for example, longerons in the case considered here. If required by the difference in thicknesses, the ramp 19 could have a greater longitudinal extension than the ramp 17.

It is considered that the present invention is applicable for parts in which the difference between the thickness E1 of the first zone 11 and the thickness E2 of the second zone 15 lies within the range of 1.5 to 15 mm.

The preferred embodiments described above may be subject to those modifications included within the scope defined by the following claims.

The invention claimed is:

1. A composite material part comprising:
   first zone with a thickness E1 and a second zone with a thickness E2, wherein:
   the composite material is made as a single part with a transition zone between the first and second zones, external surfaces of which have gradients of magnitude P1, P2;
   a stack structure of the part comprises:
   a first outer section including a first plurality of continuous outer plies that extend in the first zone, the second zone, and the transition zone, the first plurality of continuous outer plies being adjacent to each other along an entirety of their lengths,
   a second outer section including a second plurality of continuous outer plies that extend in the first zone, the second zone, and the transition zone, the second plurality of continuous outer plies being adjacent to each other along an entirety of their lengths,
   a first intermediate section including a plurality of plies that extend in the first zone and in the transition zone, terminating in a stepped manner in the transition zone so as to compensate for a difference in thickness between the first and second zones corresponding to the gradient P1, and
   a second intermediate section including a plurality of plies that extend in the first zone and in the transition zone, terminating in a stepped manner in the transition zone so as to compensate for a difference in thickness between the first and second zones corresponding to the gradient P2; and the first intermediate section is adjacent to the first outer section and the second intermediate section is adjacent to the second outer section.

2. A part according to claim 1, wherein
the stack structure includes a central section with a plurality of continuous central plies that extend in the first zone, the second zone, and the transition zone parallel to the surfaces of the first and the second zones, the plurality of continuous central plies being adjacent to each other along an entirety of their lengths;

the first and second plurality of continuous outer plies include continuous plies that extend in the first zone, the second zone, and the transition zone parallel to the respective surfaces; and the first and second intermediate sections are between the respective first and second outer sections and the central section with plies that extend in the first zone and in the transition zone parallel to the surfaces of the first zone and that terminate in a stepped manner in the transition zone.

3. A method for manufacturing a part according to claim 2, comprising:
stacking of plies of composite material on a stacking tool having a form of the external surface of the part and curing thereof in a suitable device, wherein:

a) during a first step the plies of the first outer section are stacked;
b) during a second step the plies of first the first intermediate section are stacked;
c) during a third step the plies of the central section are stacked;
d) during a fourth step the plies of the second intermediate section are stacked;
e) during a fifth step the plies of the second outer section are stacked.

4. A part according to claim 1, wherein the difference between the thicknesses E1, E2 of the first and second zones lies in a range of 1.5 to 15 mm.

5. A part according to claim 1, wherein the gradients P1, P2 are equal to or less than 1:5.

6. A part according to claim 1, forming part of a skin of a torsion box of a horizontal stabilizer of an aircraft.

7. A method for manufacturing a part according to claim 1, comprising:
stacking of plies of composite material on a stacking tool having a form of the external surface of the part and curing thereof in a suitable device;
stacking continuous plies along the three zones of the part and stacking plies which terminate in a stepped manner in the transition zone.

* * * * *